US010286955B2

(12) United States Patent
Yoshimura et al.

(10) Patent No.: US 10,286,955 B2
(45) Date of Patent: May 14, 2019

(54) REAR VEHICLE-BODY STRUCTURE OF VEHICLE

(71) Applicant: MAZDA MOTOR CORPORATION, Hiroshima (JP)

(72) Inventors: Koji Yoshimura, Hiroshima (JP); Ken Yamada, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/696,242

(22) Filed: Sep. 6, 2017

(65) Prior Publication Data

US 2018/0065671 A1 Mar. 8, 2018

(30) Foreign Application Priority Data

Sep. 6, 2016 (JP) .................................. 2016-173450

(51) Int. Cl.
| | |
|---|---|
| *B62D 21/15* | (2006.01) |
| *B60R 19/34* | (2006.01) |
| *B62D 21/02* | (2006.01) |
| *B62D 27/06* | (2006.01) |
| *B62D 29/00* | (2006.01) |

(52) U.S. Cl.
CPC ............ *B62D 21/152* (2013.01); *B60R 19/34* (2013.01); *B62D 21/02* (2013.01); *B62D 27/065* (2013.01); *B62D 29/007* (2013.01)

(58) Field of Classification Search
CPC ...... B62D 21/15; B62D 21/152; B62D 21/02; B62D 25/2017; B62D 25/2027; B60R 19/34

USPC ............. 296/203.01, 203.04, 187.11, 193.08
See application file for complete search history.

(56) References Cited

U.S. PATENT DOCUMENTS

| | | | | |
|---|---|---|---|---|
| 7,469,959 B2 * | 12/2008 | Egawa | ................... | B62D 25/08 293/154 |
| 2015/0151792 A1 | 6/2015 | Mori | | |

FOREIGN PATENT DOCUMENTS

| | | |
|---|---|---|
| JP | S56-113073 U | 9/1981 |
| JP | S58-86941 U | 6/1983 |
| JP | S59-176275 U | 11/1984 |
| JP | S61-16976 U | 1/1986 |
| JP | H7-7265 Y2 | 2/1995 |
| JP | 2002-054672 A | 2/2002 |
| JP | 2004-148955 A | 5/2004 |
| JP | 2010-241337 A | 10/2010 |
| JP | 2011-056997 A | 3/2011 |
| JP | 2015-105024 A | 6/2015 |

* cited by examiner

*Primary Examiner* — Dennis H Pedder
(74) *Attorney, Agent, or Firm* — Studebaker & Brackett PC

(57) ABSTRACT

In a rear vehicle-body structure of a vehicle provided with rear side frames, a first deformation promotion portion (recess portions) to promote inward deformation of the rear side frame is provided at each of both-side side face portions of the rear side frame, a second deformation promotion portion (opening portions) to promote outward deformation of the rear side frame is provided at a lower face portion of the rear side frame, and the first deformation promotion portion and the second deformation promotion portion are alternately arranged in an axial direction of the rear side frame.

1 Claim, 5 Drawing Sheets

Vehicle-Body Rearward Side

Vehicle-Body Forward Side

REAR VEHICLE-BODY STRUCTURE OF VEHICLE

BACKGROUND OF THE INVENTION

The present invention relates to a rear vehicle-body structure of a vehicle, and in particular, relates to the rear vehicle-body structure of the vehicle which is provided with rear side frames.

A structure of a vehicle, such as an automotive vehicle, in which a crash can is interposed between a rear bumper reinforcement extending in a vehicle width direction and a rear side frame extending in a vehicle longitudinal direction at a rear portion of a vehicle body so that when an impact load is applied from behind the vehicle body in a rear face collision (rear collision), the crash can is crushed in a folded manner so as to absorb impact energy, is known.

Further, a structure which improves the impact-energy absorption performance in the vehicle rear collision by using the rear side frame is known. Japanese Patent Laid-Open publication No. 2011-056997, for example, discloses a structure in which a linear-shaped recess portion is formed at a ridge line of a metal-made hollow pole-shaped member which is applicable to the rear side frame such that an angle which the line-shaped recess portion forms with a direction of the ridge line is within a range of 20-70 degrees, thereby improving the impact-energy absorption performance by generating bellows-shaped buckling when the impact load is applied in an axial direction of the pole-shaped member.

In recent years, it is required for the vehicle, such as the automotive vehicle, to further improve the impact-energy absorption performance in the vehicle rear collision to improve the safety of passengers in a cabin, specifically to further increase the amount of impact-energy absorption when the impact load is applied from behind the vehicle body in the vehicle rear collision.

SUMMARY OF THE INVENTION

Accordingly, an object of the present invention is to provide a rear vehicle-body structure of a vehicle which can increase the amount of impact-energy absorption in the vehicle rear collision, thereby improving the safety of passengers in the cabin.

The present invention is a rear vehicle-body structure of a vehicle which is provided with a pair of right-and-left rear side frames extending in a vehicle longitudinal direction at a vehicle-body rear portion, wherein each of the rear side frames comprises a lower face portion and both-side side face portions, a first deformation promotion portion to promote inward deformation of the rear side frame is provided at each of the both-side side face portions of the rear side frame, a second deformation promotion portion to promote outward deformation of the rear side frame is provided at the lower face portion of the rear side frame, and the first deformation promotion portion and the second deformation promotion portion are alternately arranged in an axial direction of the rear side frame.

According to the present invention, the rear side frame comprises the lower face portion and the both-side side face portions, the first deformation promotion portion to promote the inward deformation of the rear side frame is provided at each of the both-side side face portions of the rear side frame, the second deformation promotion portion to promote the outward deformation of the rear side frame is provided at the lower face portion of the rear side frame, and the first deformation promotion portion and the second deformation promotion portion are alternately arranged in the axial direction of the rear side frame.

Thereby, since the first deformation promotion portion to promote the inward deformation of the rear side frame and the second deformation promotion portion to promote the outward deformation of the rear side frame are alternately arranged in the axial direction of the rear side frame, the rear side frame can be crushed and deformed in a bellows-shaped folded manner in the axial direction in the vehicle rear collision, so that the amount of impact-energy absorption is so increased in the vehicle rear collision that the safety of passengers in the cabin can be improved.

In an embodiment of the present invention, the first deformation promotion portion and the second deformation promotion portion are respectively arranged substantially at regular intervals in the axial direction of the rear side frame.

According to this embodiment, the rear side frame can be crushed and deformed in the bellows-shaped folded manner in the axial direction regularly, thereby more effectively increasing the amount of impact-energy absorption in the vehicle rear collision.

In another embodiment of the present invention, the first deformation promotion portions which are provided at the both-side side face portions of the rear side frame are arranged at the same position in the axial direction of the rear side frame.

According to this embodiment, compared with a case where the first deformation promotion portions provided at the both-side side face portions of the rear side frame are arranged at different positions in the axial direction of the rear side frame, the inward deformation of the rear side frame can be promoted more effectively, thereby providing the above-described effects properly.

In another embodiment of the present invention, the first deformation promotion portion is a recess portion which is configured to extend along each of the both-side side face portions of the rear side frame from a lower-face portion side of the rear side frame toward an anti-lower-face portion side of the rear side frame and to be recessed toward an inside of the rear side frame.

According to this embodiment, the inward deformation of the rear side frame can be promoted by the recess portions which are provided at the side face portions of the rear side frame, thereby providing the above-described effects properly.

In another embodiment of the present invention, the recess portion is configured such that a width thereof becomes narrower from the lower-face portion side toward the anti-lower-face portion side of the side face portion of the rear side frame.

According to this embodiment, the inward deformation of the rear side frame can be promoted stably by the recess portion with a deformation staring point which is positioned at a lower-face-portion side of the recess portion.

In another embodiment of the present invention, the second deformation promotion portion is an opening portion which is provided at the lower face portion of the rear side frame.

According to this embodiment, the outward deformation of the rear side frame can be promoted by the opening portion provided at the lower face portion of the rear side frame, thereby providing the above-described effects properly.

Other features, aspects, and advantages of the present invention will become apparent from the following description which refers to the accompanying drawings.

DETAILED DESCRIPTION OF THE INVENTION

Hereafter, an embodiment of the present invention will be described referring to the accompanying drawings.

Figure 1:
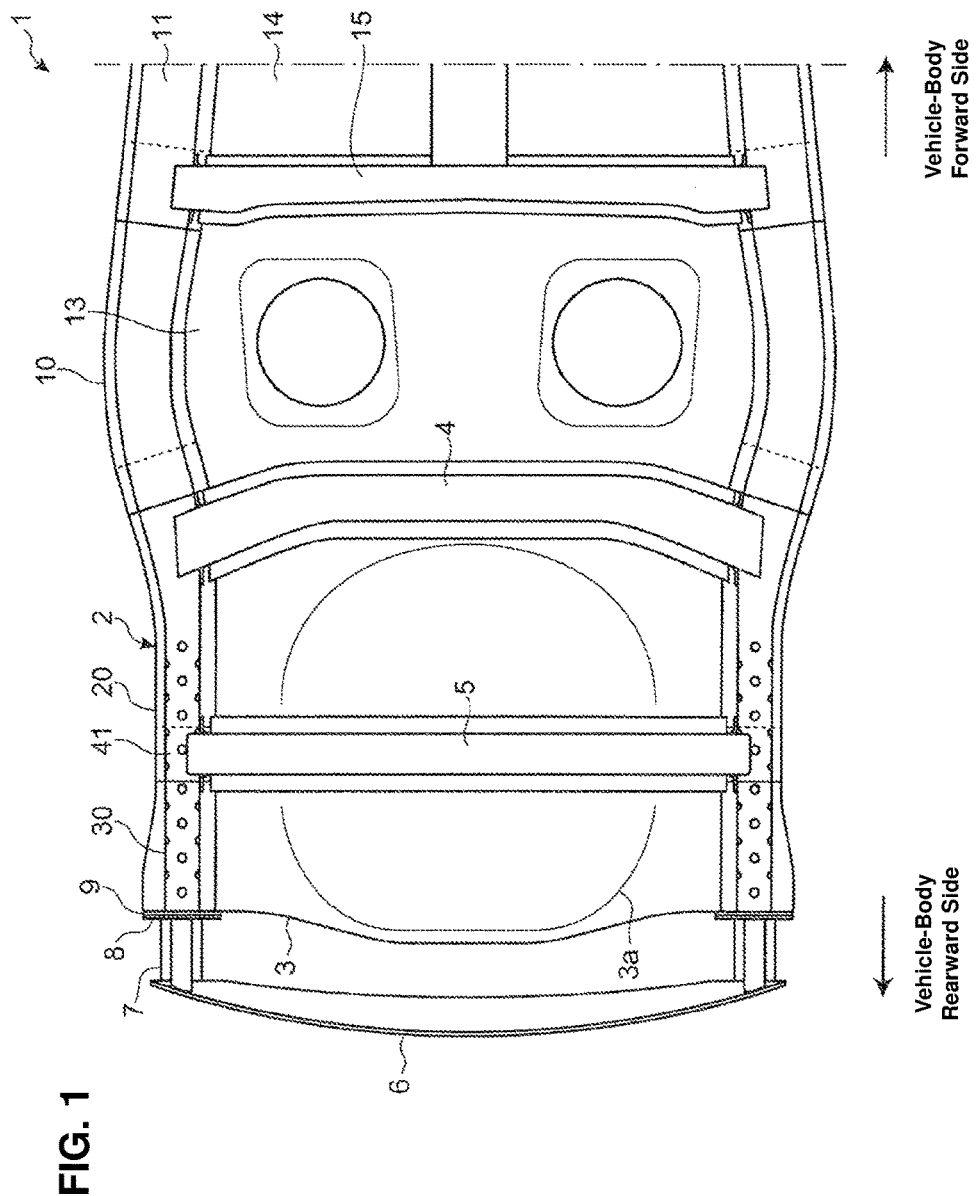
FIG. 1 is a bottom view of a vehicle body to which a rear vehicle-body structure of a vehicle according to an embodiment of the present invention is applied.
Figure 2:
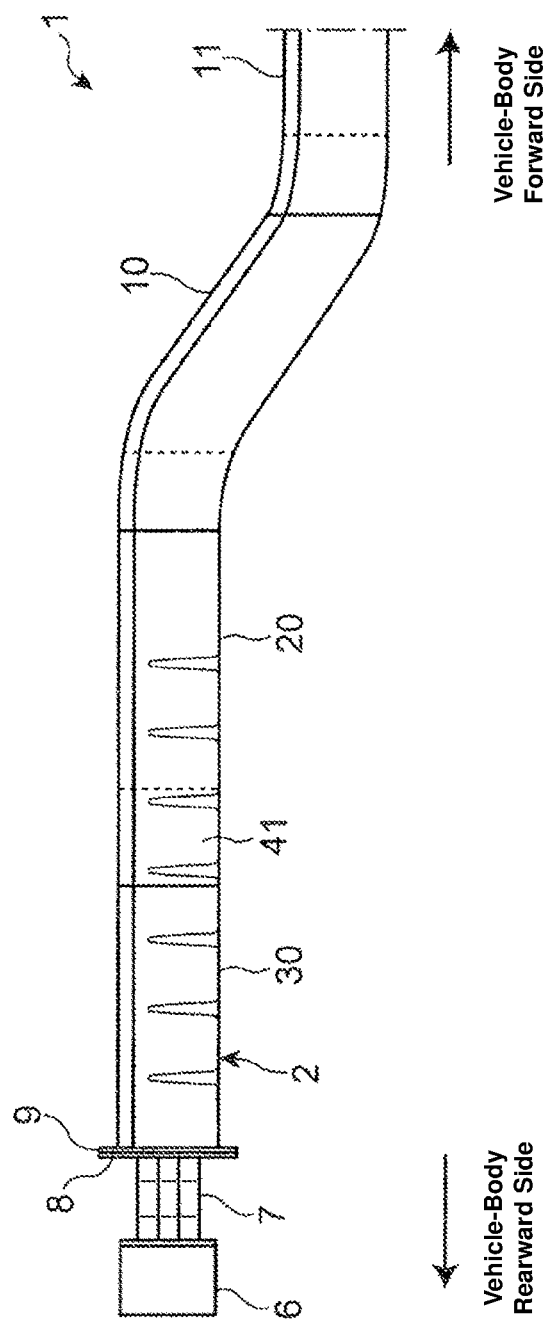
FIG. 2 is a side view of the vehicle body to which the rear vehicle-body structure of the vehicle according to the embodiment of the present invention is applied.
Figure 3:
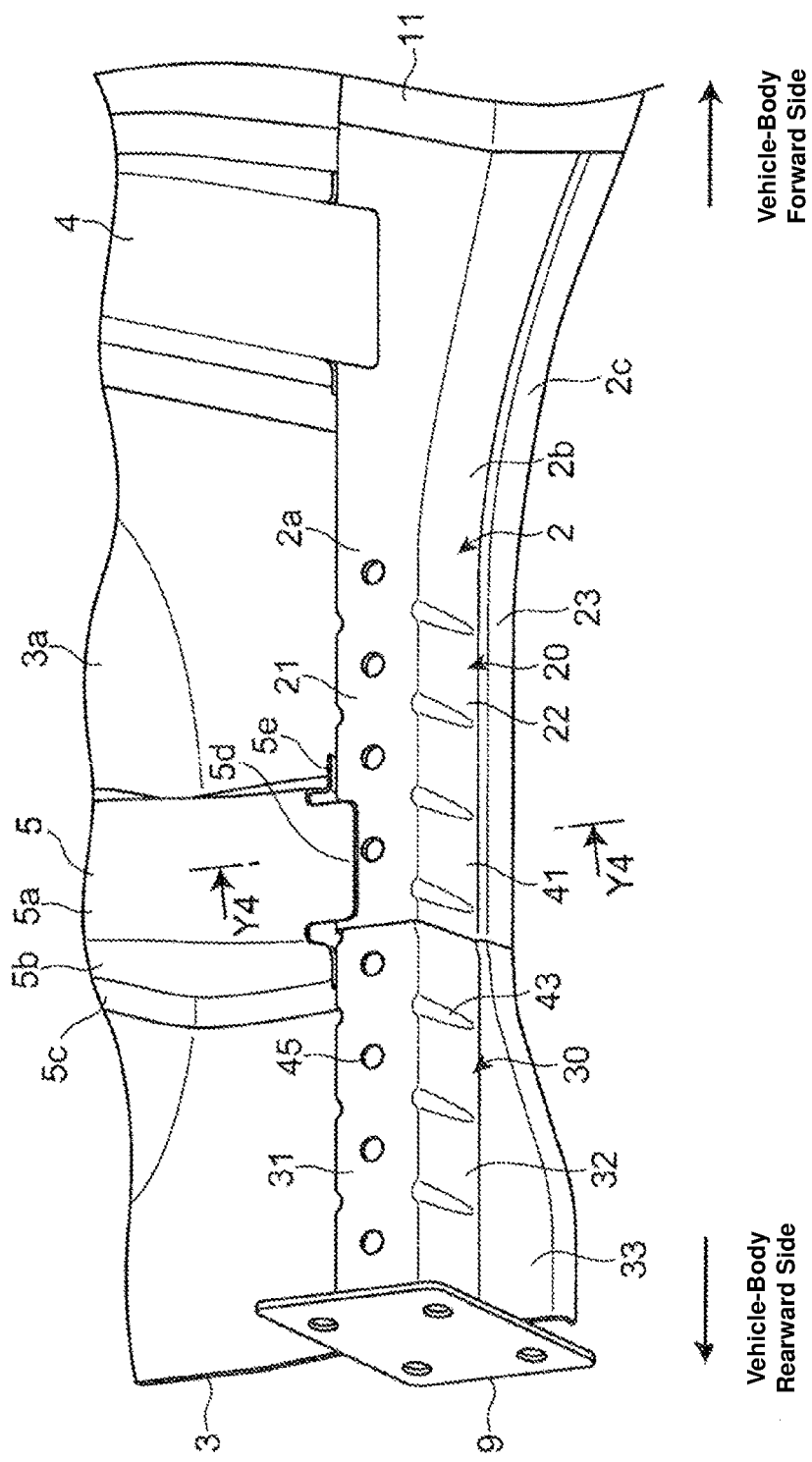
FIG. 3 is a perspective view showing a major part of the vehicle body shown in FIG. 1.
Figure 4:
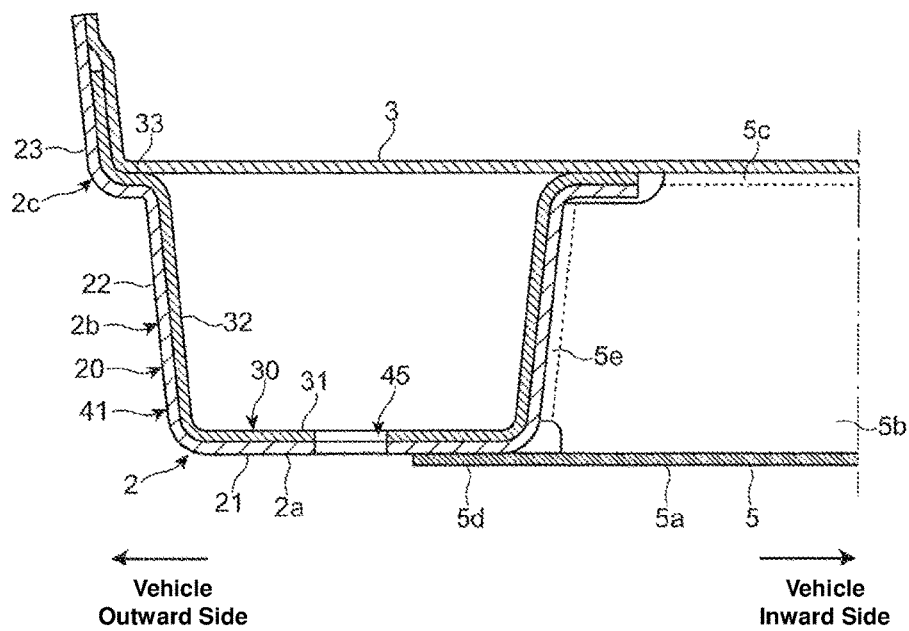
FIG. 4 is a sectional view of the vehicle body taken along line Y4-Y4 of FIG. 3.

FIG. 1 is a bottom view of a vehicle body to which a rear vehicle-body structure of a vehicle according to an embodiment of the present invention is applied, FIG. 2 is a side view of the vehicle body to which the rear vehicle-body structure of the vehicle according to the embodiment of the present invention is applied, FIG. 3 is a perspective view showing a major part of the vehicle body shown in FIG. 1, and FIG. 4 is a sectional view of the vehicle body taken along line Y4-Y4 of FIG. 3.

As shown in FIGS. 1 through 4, a vehicle body 1 to which a rear vehicle-body structure of a vehicle according to the embodiment of the present invention is applied comprises a pair of right-and-left rear side frames 2 which extend in a vehicle longitudinal direction, a rear floor panel 3 which is laid between the pair of right-and-left rear side frames 2, and a No. 4 cross member 4 and a No. 5 cross member 5 which respectively extend in a vehicle width direction below of the rear floor panel 3 and are laid between the pair of right-and-left rear side frames 2, being spaced, in the vehicle longitudinal direction, apart from each other.

The No. 4 cross member 4 is provided to interconnect respective forward sides of the right-and-left rear side frames 2. The No. 5 cross member 5 is provided to interconnect respective central sides, in the vehicle longitudinal direction, of the right-and-left rear side frames 2 and arranged below a spare-tire storage portion 3a which is configured to be concaved downward at the rear floor panel 3.

The rear side frame 2 has a roughly U-shaped cross section and is attached at a lower face side of the rear floor panel 3, and cooperates with the rear floor panel 3 to form a closed cross section extending in the vehicle longitudinal direction. The No. 4 cross member 4 and the No. 5 cross member 5 respectively have a roughly hat-shaped cross section and are attached at the lower face side of the rear floor panel 3, and cooperate with the rear floor panel 3 to form a closed cross section extending in the vehicle with direction.

Respective rear end portions of the right-and-left rear side frames 2 are attached to crash cans 7 which are respectively provided at both end portions of a rear bumper reinforcement 6 which is arranged inside a rear bumper (not illustrated) which extends in the vehicle width direction at a vehicle-body rear portion. The crash can 7 is configured to be crushable in a folded manner so as to absorb impact energy when an impact load is applied from behind the vehicle body 1 in a vehicle rear collision.

A first plate member 8 which extends in a direction roughly perpendicular to the vehicle longitudinal direction is fixedly attached to a front end portion of the crush can 7 by welding or the like, and a second plate member 9 which extends in the direction roughly perpendicular to the vehicle longitudinal direction is fixedly attached to a rear end portion of the rear side frame 2 by welding or the like.

The first and second plate members 8, 9 are respectively formed in a roughly rectangular shape, and four bolt insertion holes are respectively formed at their peripheral edge portions. The first and second plate members 8, 9 are fastened by using bolts inserted into the four bolt insertion holes and nuts, whereby the crush can 7 and the rear side frame 2 are connected and the rash can 7 is disposed between the rear bumper reinforcement 6 and the rear side frame 2.

A front end portion of the rear side frame 2 is overlapped with and connected to a rear end portion of a kick-up frame 10 which is configured to extend obliquely outward and downward toward the vehicle forward side, and a front end portion of the kick-up frame 10 is overlapped with and connected to a rear end portion of the front floor frame 11 extending in the vehicle longitudinal direction.

Between the right-and-left kick-up frames 10 is laid a center floor panel 13 which is provided in front of the rear floor panel 3 and extends obliquely forward and downward, and a front floor panel 14 which is provided in front of the center floor panel 13 is laid between the right-and-left front floor frames 11. A cabin is formed on the front floor panel 14 of the vehicle body 1.

The lick-up frame 10 has a roughly hat-shaped cross section and is attached at a lower face side of the center floor panel 13, and cooperates with the center floor panel 13 to form a closed cross section extending in the vehicle longitudinal direction. The front floor frame 11 has a roughly hat-shaped cross section and is attached at a lower face side of the front floor panel 14, and cooperates with the front floor panel 14 to form a closed cross section extending in the vehicle longitudinal direction.

At the lower face side of the front floor panel 14 are also attached plural cross members which extend in the vehicle width direction and are laid between the right-and-left front floor frames 11, being spaced apart from each other.

As show in FIG. 1, a No. 3 cross member 15 is laid between the right-and-left front floor frames 11 in front of the No. 4 cross member 4. The No. 3 cross member 15 has a roughly hat-shaped cross section and is attached at the lower face side of the front floor panel 14, and cooperates with the front floor panel 14 to form a closed cross section extending in the vehicle with direction. The other cross members laid between the right-and-left front floor frame 11 are configured similarly to the No. 3 cross member 15.

Next, the rear side frame 2 of the vehicle body 1 according to the present embodiment will be described. As shown in FIGS. 3 and 4, the rear side frame 2 comprises a lower face portion 2a, side face portions 2b which are provided at both sides of the lower face portion 2a to extend roughly perpendicularly from the lower face portion 2a and has a roughly U-shaped cross section. The rear side frame 2 further includes flange portions 2c which are provided at both sides of the side face portion 2b to extend outward, and the both-side flange portions 2c are attached to the rear floor panel 3.

In the vehicle body 1, the rear side frame 2 comprises longitudinally-split parts of a front-side frame 20 which is arranged on a forward side of the vehicle body and a rear-side frame 30 which is arranged in back of the front-side frame 20, and a rear end portion of the front-side fame 20 and a front end portion of the rear-side frame 30 are overlapped and joined.

The front-side frame 20 and the rear-side frame 30 respectively comprise lower face portions 21, 31 and side face portions 22, 32 which respectively extend from and roughly perpendicularly to the lower face portions 21, 31 on both sides, and respectively have a roughly U-shaped cross section. Further, the both-side side face portions 22, 32 of the front-side frame 20 and the rear-side frame 30 are respectively provided with both-side flange portions 23, 33 which extend outward, and the both-side flange portions 23, 33 are attached to the rear floor panel 3.

The rear end portion of the front-side frame 20 and the front end portion of the rear-side frame 30 are overlapped in a state where the front end portion of the rear-side frame 30 is inserted into an inside of the rear end portion of the front-side frame 20, and an overlap portion 41 where the rear end portion of the front-side frame 20 and the front end portion of the rear-side frame 30 are overlapped is fixed joined by welding or the like as shown in FIG. 4.

For example, the rear-side frame 30 is formed by pressing a steel plate with a plate thickness of 1.4 mm and the front-side frame 20 is formed by pressing a steel plate with the plate thickness of 1.6 mm Thus, the rear-side frame 30 is made of a thinner steel plate than the front-side frame 20 so that the strength of the rear-side frame 30 against compressing of the axial direction is lower than that of the front-side frame 20. Thereby, in the rear side frame 2 of the present embodiment, the strength of the front-side frame 20 excluding the overlap portion 41 against compressing of the axial direction is greater than that of the rear-side frame 30 excluding the overlap portion 41, and the strength of the overlap portion 41 against compressing of the axial direction is greater than that of the front-side frame 20 excluding the overlap portion 41.

As shown in FIG. 3, in the present embodiment, the rear side frame 2 includes recess portions 43 as a first deformation promotion portion to promote inward deformation of the rear side frame 2 at the both-side side face portions 2b. The recess portion 43 is configured to extend in a direction roughly perpendicular to an axial direction of the rear side frame 2 along the side face portion 2b from a lower-face portion side of the rear side frame 2 toward an anti-lower-face portion side of the rear side frame 2 and to be recessed toward an inside of the rear side frame 2.

Figure 5A:
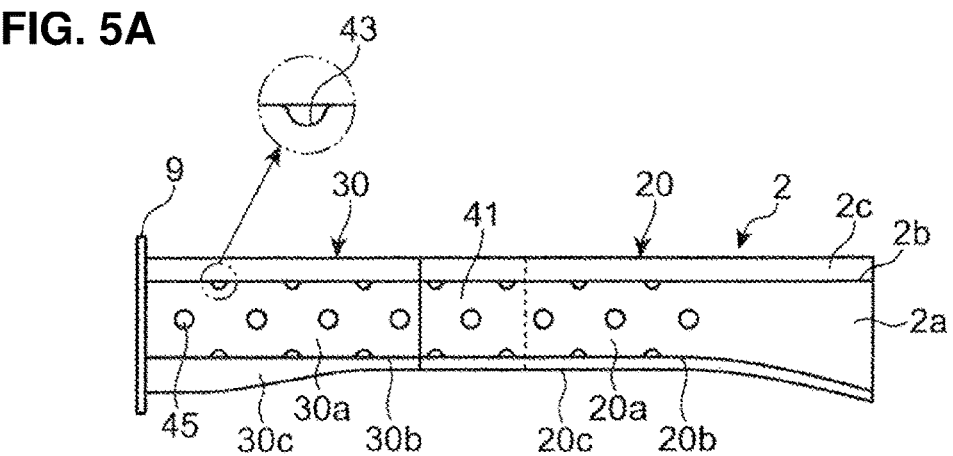
FIGS. 5A and 5B are a bottom view and a side view of a rear side frame.
Figure 5B:
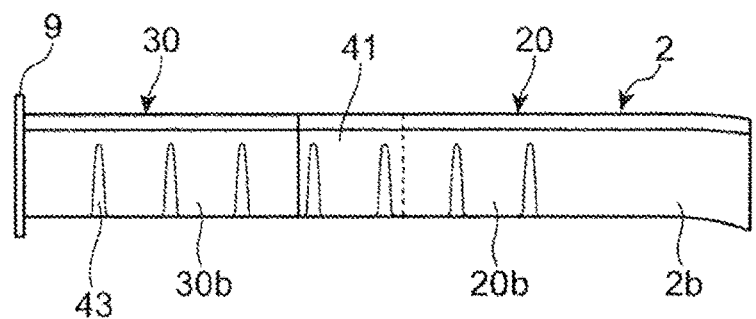

FIGS. 5A and 5B are respectively a bottom view and a side view of the rear side frame. As shown in FIG. 5A, the plural recess portions 43 provided at the both-side side face portions 2b of the rear side frame 2 are arranged at the same position in the axial direction of the rear side frame 2 substantially at regular intervals.

Each recess portion 43 is configured such that its width becomes narrower toward the upward side as shown in FIG. 5B. The recess portion 43 is also configured such that its cross section is of a roughly semicircular shape and its depth and opening width becomes smaller toward the upward side. Herein, the recess portion 43 may be configured to have another shaped cross section, such as a roughly rectangular-shaped cross section.

The rear side frame 2 further includes opening portions 45 as a second deformation promotion portion to promote outward deformation of the rear side frame 2 at the lower face portion 2a. Each of the opening portions 45 is of a circular shape, and the plural opening portions 45 are formed at a central side, in the vehicle width direction, of the lower face 2a of the rear side frame 2 substantially at regular intervals, being spaced apart from each other in the axial direction of the rear side frame 2. Herein, the opening portion 45 may be configured to have another shape, such as a slot shape.

As shown in FIG. 5A, the recess portions 43 and the opening portions 45 are alternately arranged in the axial direction of the rear side frame 2, and each opening portion 45 which is formed at the lower face portion 2a of the rear side frame 2 is disposed at a substantially middle position between the two adjacent recess portions 43 which are formed at the side faces 2b of the rear side frame 2 in the axial direction of the rear side frame 2.

In the vehicle body 1, the rear side frame 2 comprises the split front-side and rear-side frames 20, 30, the recess portions 43 are formed at the side face portions 22, 32 of the front-side and rear-side frames 20, 30, and the opening portions 45 are formed at the lower face portions 21, 31 of the front-side and rear-side frames 20, 30.

As described above, the No. 5 cross member 5 is laid between the rear side frames 2, and the No. 5 cross member 5 is connected to the overlap portion 41 of the rear end portion of the front-side frame 20 of the rear side frame 2 and the front end portion of the rear-side frame 30 of the rear side frame 2 as shown in FIGS. 3 and 4. The right-and-left rear side frames 2 are configured similarly and the No. 5 cross member 5 is connected to the overlap portion 41 of one of the rear side frames 2 and the overlap portion 41 of the other rear side frame 2 at its both end portions.

As shown in FIG. 3, the No. 5 cross member 5 comprises a lower face portion 5a, side face portions 5b which are provided at both sides of the lower face portion 2a to extend roughly perpendicularly from the lower face portion 5a, and both-side flange portions 5c which are provided to extend outward from the both-side side face portions 5b, and has a roughly U-shaped cross section. The both-side flange portions 5c are attached at the lower-face side of the rear floor panel 3.

The No. 5 cross member 5 is further provided with flange portions 5d which extend in the axial direction from the lower face portion 5a and both-side flange portions 5e which extend outward in a direction roughly perpendicular to and from the both-side side face portions 5b.

The flange portions 5d of the No. 5 cross member 5 are connectedly attached to the lower face portion 2a of the rear side frame 2 at the overlap portion 41 of the rear side frame 2 by welding or the like. The both-side flange portions 5e of the No. 5 cross member 5 are connectedly attached to the inward-side side face portion 2b of the rear side frame 2 at the overlap portion 41 of the rear side frame 2 by welding or the like.

In a case where the impact load is applied to the above-described vehicle body 1, when the load is inputted to the rear side frame 2 after the crash cans 7 are crushed, the rear side frame 2 is crushed and deformed in such a manner that the rear-side frame 30 excluding the overlap portion 41 is crushed first and then the front-side frame 20 excluding the overlap portion 41 is crushed before the overlap portion 41 of the front-side frame 20 and the rear-side frame 30 has been crushed, thereby absorbing the impact energy.

Further, since the recess portions 43 as the first deformation promotion portion and the opening portions 45 as the second deformation promotion portion are alternately arranged in the axial direction, the rear side frame 2, particularly, the side face portions 2b of the rear side frame 2 are crushed and deformed in the bellows-shaped folded manner in the axial direction, thereby absorbing the impact energy.

While the rear-side frame 30 of the present embodiment is configured such that the strength thereof against the compressing of the axial direction is set to be low by using the thinner steel plate than the front-side frame 20, a high-tensile steel plate having the tensional strength of 590 MPa or greater may be used for the rear-side frame 30 and another high-tensile steel plate having the tensional strength of 780 MPa or greater may be used for the rear-side frame 20, for example, so that the strength of the rear-side frame 30 against the compressing of the axial direction can be set to be lower than that of the front-side frame 20. Alternatively, the strength of the rear-side frame 30 against the compressing of the axial direction may be set to be lower than that of the front-side frame 20 by using the steel plate having the thinner plate thickness than the front-side frame 20.

Further, while the rear side frame 2 is formed by being spit into the front-side frame 20a and the rear-side frame 30 in the present embodiment, the rear side frame 2 may be formed by a single frame. In this case as well, the recess portions 43 as the first deformation promotion portion to promote the inward deformation of the rear side frame 2 are provided at the both-side side face portions 2b of the rear side frame 2, the opening portions 45 as the second deformation promotion portion to promote the outward deformation of the rear side frame 2 are provided at the lower face portion 2a of the rear side frame 2, and the first deformation promotion portion 43 and the second deformation promotion portion 45 are alternately arranged in the axial direction of the rear side frame 2.

As described above, according to the rear vehicle-body structure of the vehicle of the present embodiment, the rear side frame 2 comprises the lower face portion 2a and the both-side side face portions 2b, the first deformation promotion portion 43 to promote the inward deformation of the rear side frame 2 is provided at each of the both-side side face portions 2b of the rear side frame 2, the second deformation promotion portion 45 to promote the outward deformation of the rear side frame 2 is provided at the lower face portion 2a of the rear side frame 2, and the first deformation promotion portion 43 and the second deformation promotion portion 45 are alternately arranged in the axial direction of the rear side frame 2.

Thereby, since the first deformation promotion portion 43 to promote the inward deformation of the rear side frame 2 and the second deformation promotion portion 45 to promote the outward deformation of the rear side frame 2 are alternately arranged in the axial direction of the rear side frame 2, the rear side frame 2, particularly the side face portions 2b of the rear side frame 2 can be crushed and deformed in the bellows-shaped folded manner in the axial direction in the vehicle rear collision, so that the amount of impact-energy absorption is so increased in the vehicle rear collision that the safety of passengers in the cabin can be improved.

Further, since the first deformation promotion portion 43 and the second deformation promotion portion 45 are respectively arranged substantially at regular intervals in the axial direction of the rear side frame 2, the rear side frame 2 can be crushed and deformed in the bellows-shaped folded manner in the axial direction regularly, thereby more effectively increasing the amount of impact-energy absorption in the vehicle rear collision.

Moreover, since the first deformation promotion portions 43 which are provided at the both-side side face portions 2b of the rear side frame 2 are arranged at the same position in the axial direction of the rear side frame 2, compared with a case where the first deformation promotion portions 43 provided at the both-side side face portions 2b of the rear side frame 2 are arranged at different positions in the axial direction of the rear side frame 2, the inward deformation of the rear side frame 2 can be promoted more effectively.

Also, since the first deformation promotion portion is the recess portion 43 which is configured to extend along each of the both-side side face portions 2b of the rear side frame 2 from the lower-face portion side of the rear side frame 2 toward an anti-lower-face portion side of the rear side frame 2 and to be recessed toward an inside of the rear side frame 2 and also such that its width becomes narrower from the lower-face portion side toward the anti-lower-face portion side of the side face portion 2b of the rear side frame 2, the inward deformation of the rear side frame 2 can be promoted stably by the recess portion 43 with a deformation staring point which is positioned at a lower-face-portion side of the recess portion 43.

The present invention should not be limited to the above-described embodiment and any other modifications or improvements may be applied within the scope of a spirit of the present invention.

What is claimed is:

1. A rear vehicle-body structure of a vehicle which is provided with a pair of right-and-left rear side frames extending in a vehicle longitudinal direction at a vehicle-body rear portion, wherein each of said rear side frames comprises a lower face portion and both-side side face portions so as to have a roughly U-shaped cross section, a side flange portion which is provided at the both-side side face portions being attached to at a lower face side of a rear floor panel which is laid between the pair of right-and-left rear side frames so that a closed cross section is formed between the rear side frame and the rear floor panel, a first deformation promotion portion to promote inward deformation of the rear side frame is provided at each of said both-side side face portions of the rear side frame, a second deformation promotion portion to promote outward deformation of the rear side frame is provided only at said lower face portion of the rear side frame, each of said first and second deformation promotion portions is composed of plural deformation promotion portions, said first plural deformation promotion portions and said second plural deformation promotion portions are alternately arranged in an axial direction of the rear side frame, each of said first plural deformation promotion portions and said second plural deformation promotion portions are arranged substantially at regular intervals in the axial direction of the rear side frame, said first plural deformation promotion portions which are respectively provided at the both-side side face portions of the rear side frame are arranged at the same position in the axial direction of the rear side frame, each of said first plural deformation promotion portions is a recess portion which is configured to extend upwardly along each of the both-side side face portions of said rear side frame from a lower-face portion side of the rear side frame toward an upper side and to be recessed toward an inside of the rear side frame, the recess portion being configured such that an upwardly-extending length thereof is greater than a recessed depth thereof and a width thereof becomes narrower from the lower-face portion side toward the upper side of the rear side frame, each of said second plural deformation promotion portions is an opening portion which is provided only at the lower face portion of said rear side frame, and each of said opening portions provided only at the lower face portion of the rear side frame is located substantially at a center between respective positions, in axial direction of rear side frame, of two recess portions provided at the both-side side face portions of the rear side frame which are positioned adjacently to each other in the axial direction of the rear side frame.

* * * * *